March 24, 1936.     C. B. JUDSON     2,034,870
SWITCH
Filed June 20, 1933     2 Sheets-Sheet 1
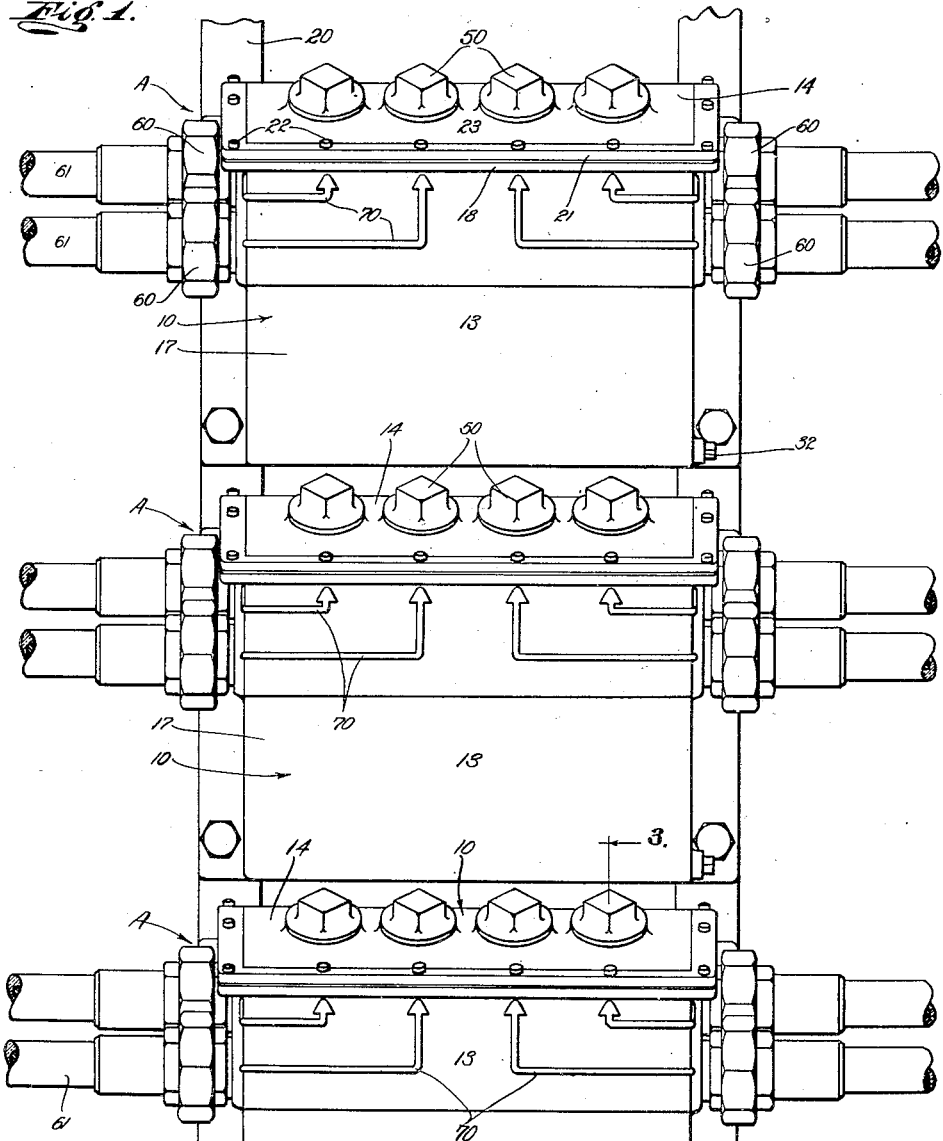
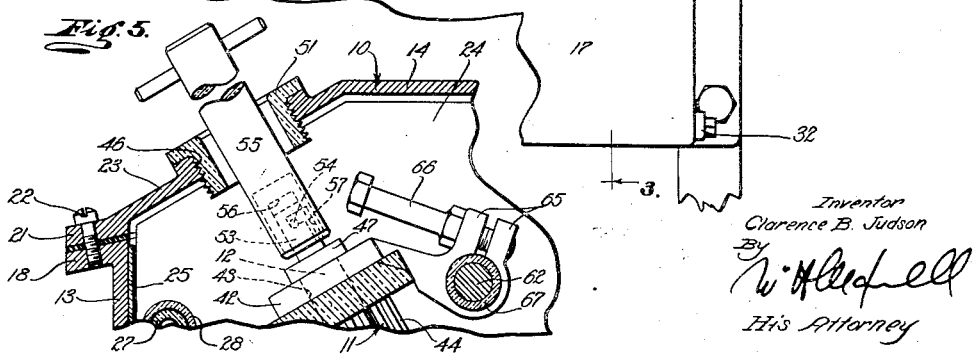
Inventor
Clarence B. Judson
By W. H. Caldwell
His Attorney

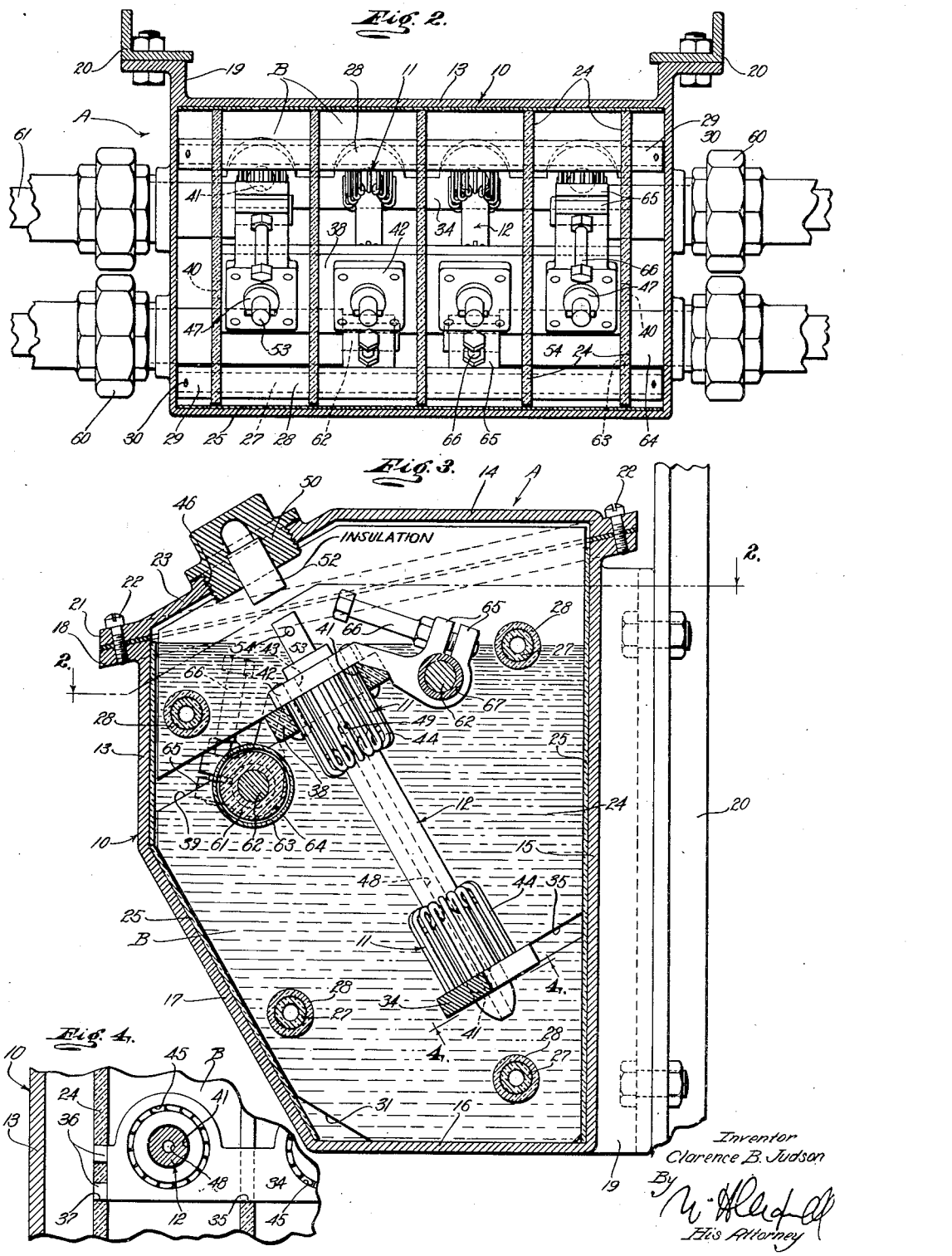

Patented Mar. 24, 1936

2,034,870

UNITED STATES PATENT OFFICE 2,034,870

SWITCH

Clarence B. Judson, Los Angeles, Calif.

Application June 20, 1933, Serial No. 676,637

9 Claims. (Cl. 173—328)

This invention relates to a switch, and relates more particularly to a disconnect switch for use in polyphase systems.

It is a general object of the present invention to provide a simple, compact disconnect switch that is safe and convenient to operate.

The types of junction boxes or disconnect switches employed in underground electrical transmission systems are usually very hazardous to operate and often cause extended interruption of the service when attempts are made to operate them. In one class of junction box or disconnecting switch now in use in underground systems, the conductors carrying all of the phases of the circuit enter a single box or housing containing air brake blade switch units. Operation of the type of junction box or switch just mentioned is very dangerous under any conditions, and when the operator operates the wrong switch blade, a polyphase short circuit is immediately created which may seriously injure the operator and disrupt the service for a substantial period of time. In another class of junction box or disconnect switch, in order to break a circuit, the lug or device holding the cable must be loosened and the cable pulled out of the box thus exposing the end of the cable which makes it subject to contact with adjacent equipment thus causing a short circuit or other trouble. The types of disconnect switches or junction boxes now in general use are usually very large which is extremely undesirable, as the space in the manhole vault of an underground system is often very limited.

An object of this invention is to provide a junction box or disconnect switch for use in an electrical transmission system that is easy and convenient to operate and that may be operated without danger of injuring the operator or equipment. In accordance with the invention the disconnecting members or pins may be removed and the conductors or cables may be connected and disconnected from their contacts without removing the cover of the housing of the switch unit and without endangering the operator or equipment.

Another object of the invention is to provide a switch of the character mentioned that is small and compact so that it occupies a minimum amount of space in a manhole, vault, substation, switch room, pole, or the like.

Another object of the invention is to provide a disconnect switch of the character mentioned that provides for the simple and easy correction of phase relations between the primary conductors and the balancing of the lines.

Another object of the invention is to provide a disconnect switch of the character mentioned including a separate and individual switch unit for each phase of the primary circuit.

It is another object of the invention to provide a disconnect switch of the character mentioned that greatly facilitates the locating and correction of trouble in the system.

It is another object of the invention to provide a junction box or disconnect switch for use in an underground system in which the parts are conveniently accessible for operation.

It is another object of the invention to provide a switch of the character mentioned that includes a unit for each phase of the primary circuit, each unit including a housing, a plurality of pairs of multi-point contacts in a bath of oil in the housing and disconnecting pins normally cooperating with the contacts that may be conveniently and safely removed to break the circuits.

A further object of the invention is to provide a switch of the character mentioned that is inexpensive of manufacture and installation.

Other objects and features of the invention will be best and more fully understood from the following detailed description of a typical form and application of the invention, throughout which description reference is had to the accompanying drawings, in which:

Fig. 1 is a front elevation of a three unit switch provided by the present invention illustrating the units of the switch mounted on a typical carrier or frame. Fig. 2 is an enlarged horizontal detailed sectional view of one switch unit taken substantially as indicated by line 2—2 on Fig. 3. Fig. 3 is an enlarged transverse vertical detailed sectional view taken as indicated by line 3—3 on Fig. 1. Fig. 4 is a fragmentary sectional view taken substantially as indicated by line 4—4 on Fig. 3, and Fig. 5 is a fragmentary vertical sectional view illustrating the manner of engaging and handling the disconnecting pins.

The switch provided by the present invention includes, generally, a unit A for each phase of the primary circuit in which the switch is connected, each unit comprising the housing 10, a plurality of pairs of spaced contacts 11 in a housing, and removable disconnecting pins 12 normally cooperating with the contacts 11.

In accordance with the broader aspects of the invention, the units A may each be provided with any desired number of sets of contacts 11 and pins 12, and the housings 10 of the units may be constructed to contain the desired or required number of sets of contacts and pins. The particular switch illustrated in the drawings is in the nature of a three phase four-way switch, each unit A being adapted to receive four cables or conductors.

Each unit A is adapted to handle one phase of the primary circuit, that is, it is adapted to receive and electrically connect the conductors of one phase of the circuit. As each of the switch units A may be identical, I will proceed with a detailed description of one unit A, it being understood that such description may apply to each of the three units.

The housing 10 of the switch unit A includes a body 13, and a cap or cover 14 closing the upper end of the body. The body 13 may be in the nature of a casting and may be shaped and proportioned so as to effectively carry the various parts of the switch unit. The body 13 is hollow, having comparatively thin walls, the back wall 15 being vertical and the bottom wall 16 being horizontal. The lower portion 17 of the front wall of the housing body 13 is inclined downwardly and rearwardly as clearly illustrated in Fig. 3 of the drawings. The upper end or edge of the body 13 is inclined downwardly and outwardly and has an outwardly projecting flange 18. Vertical rearwardly projecting flanges 19 may be provided on the back wall 15 to facilitate the attachment of the housing 10 to a frame or carrier 20. The cover 14 is provided at its edge with a flange 21 removably connected with the flange 18 of the body by screws 22. The cover 14 completely closes the upper end of the body 13 and a gasket may be provided between the flanges 18 and 21 to provide a fluid tight seal. The forward or outer portion 23 of the cover 14 is inclined downwardly and forwardly.

In accordance with the broader aspects of the invention, the three units A of the switch may be mounted in any suitable position and relation; however, in order to conserve space and provide for the easy accessibility of the parts of the units, the housings 10 of the three units A are preferably mounted one above the other in spaced relation on a suitable frame or carrier 20 in the manner illustrated in Fig. 1 of the drawings. The inclined portions 17 and 23 of the adjacent housings 10 provide for the convenient handling and operation of the pins 12 and other parts through openings in the portions 23, as will be more fully described.

The body 13 of the unit A is provided with a lining 25 of suitable insulating material, and contains a bath of oil or other suitable liquid for resisting arcing between current carrying parts within the housing. In accordance with the invention, the interior of the body 13 is divided into four equal compartments B. Spaced vertical partitions or barrier plates 24 are arranged in the body 13 of the housing to provide the compartments B. The plates 24 are formed of insulating material and are equally spaced apart to divide the interior of the body 13 into four equal compartments B which house the pairs of contacts 11 and their pins 12. The outermost plates or end plates 24 are preferably spaced from the opposite ends of the body 13 in the manner illustrated in Fig. 2. The partitions or barrier plates 24 rest on the bottom wall 16 of the body 13 and support the contacts 11 and various parts in the housing. Means is provided for maintaining the plates 24 in their proper spaced relation. A plurality of rods or tubes 27 extend horizontally or longitudinally in the housing 10 and pass through spaced transverse openings in the plates. Spacer tubes or sleeves 28 surround the tubes 27 and space apart the several plates 24. The tubes 27 and sleeves 28 are formed of a suitable insulating material. The inner tubes 27 project from the end plates 24 and their projecting portions carry sleeves 29. Pins 30, or the like, extend through transverse openings in the sleeves 29 and tubes 27 to lock the assembly together. The plates 24 may be cut away at their lower ends as illustrated at 31 to provide free fluid communication between the several compartments B to maintain a common oil level in the compartments. A normally plugged oil drain 32 is provided in the lower end part of the body 13 of the housing.

A pair of spaced contacts 11 is provided in each compartment B of the housing 10. In accordance with the invention, there is a lower contact 11 and an upper contact 11 in each of the compartments. The four lower contacts 11 are carried by a transfer bus 34. The transfer bus 34 is an elongate member of rectangular cross section and is supported by the plates 24. The bus 34 is spaced above the bottom 16 of the housing body 13 and lies in a plane parallel with the inclined portion 23 of the cover 14. In the preferred construction illustrated in the drawings the transfer bus 34 extends through inclined slots 35 in the intermediate plates 24 and has spaced lugs 36 on its opposite ends carried in openings 37 in the end plates 24. The engagement of the bus 34 with the two end plates 24 holds the bus against longitudinal movement. The slots 35 extend to the rear edges of the plates 24 to permit the easy assembling of the plates and bus 34. The four upper contacts 11 are carried by a support 38 of insulating material. The support 38 is carried by the plates 24 and lies in a plane parallel to the bus 34 and the inclined portion 23 of the cover. Elongate inclined slots 39 are provided in the intermediate plates 24 to carry the support 38. Projections or lugs 40 are provided on the opposite ends of the support 38 and are carried in openings in the end plates 24. Aligned transverse openings 41 are provided in the bus 34 and support 38.

The lower contacts 11 are carried directly by the transfer bus 34, while the upper contacts 11 are carried by lugs or blocks 42 of brass, or the like, attached to the upper side of the support 38. Openings 43 are provided in the lugs or blocks 42 to register with the openings 41 in the support 38. The contacts 11 are of the "Squirrel cage" or multi-point contact type, each consisting of a plurality of springs or wires 44. The wires 44 of the contacts 11 are arranged in tubular or annular series to form tubular assemblies. The wires 44 of the upper contacts 11 project from the lower sides of the blocks 42 and extend downwardly through the openings 41 in the support 38, while the wires 44 of the lower contacts 11 project upwardly from the upper side of the bus 34. The several wires 44 of the contacts 11 are parallel and are rigidly attached to the blocks 42 and bus 34. In the particular construction illustrated in the drawings, the contact wires 44 pass through spaced openings in the blocks 42 and bus 34 and have end parts bent into annular recesses 45 in the manner illustrated in Fig. 4. The outer end portions of the contact wires 44 are looped or bent inwardly to contact with the disconnecting pins 12, as will be hereinafter described. The support 38 and the bus 34 are located so that the contacts 11 are entirely submerged in the oil contained in the housing body 13.

The disconnecting pins 12 normally extend between and are engaged by the pairs of spaced contacts 11 and are easily and safely removable to break the circuits in the switch unit A. The pins 12 are elongate members of copper, or the like, and are adapted to be engaged and operated through openings 46 in the inclined portions 23 of the cover 14. In the preferred form of the invention, the pins 12 are of round cross section and are proportioned to be effectively gripped by the looped outer portions of the flexible contact wires 44 of the contacts 11. The lower ends of the pins 12 are rounded to facilitate the insertion of the pins through the contacts. Rings or shoulders 47 of steel, or the like, are attached to the pins 12 and are adapted to engage the outer sides of the lugs or blocks 42 to limit the downward movement of the pins through the contacts and to support the pins in their proper positions. The invention provides means for cooling the disconnecting pins 12 so as to prevent the pins from becoming overheated. Longitudinal fluid passages 48 extend upwardly through the pins 12 from their lower ends. Transverse openings 49 are provided in the pins 12 to connect with the upper ends of the passages 48. It will be apparent how the oil contained in the housing body 13 circulates through the passages 48 and 49 of the pins to effectively cool the pins.

The present invention provides means for facilitating the easy and safe handling of the disconnecting pins 12. The access openings 46 in the cover 14 are normally closed by threaded plugs 50. A safety block 52 of the insulation projects from the inner side of each plug 50 to engage the upper end of the pin 12 in the event that the pin is not in its proper position where the shoulder 47 seats on the block 42. When a pin 12 is to be removed, the plug 50 above the pin is unthreaded from the opening 46 and a safety sleeve or bushing 51 of suitable substantially rigid insulating material, is threaded into the opening 46. A reduced portion 53 of steel, or the like, is provided on the upper end of each pin 12 and has a bayonet pin 54 projecting from its opposite sides. A pin handling tool is provided to facilitate the extraction and insertion of the disconnecting pins 12. The tool comprises a stem and handle 55 of insulation and a metallic socket 56 in the end of the stem having bayonet slots 57 for receiving the pins 54. It will be apparent how the stem 55 of the tool may be inserted through the safety bushing 51 and how the pin 54 on the upper end of the disconnecting pin 12 may be engaged in the slots 57 so that the pin 12 may be pulled outwardly to disconnect from the lower contact 11 or from both the upper and the lower contacts. The bushing 51 and the handle 55 of insulation positively prevent shorting or grounding during handling of the pins 12.

The invention provides means for releasably connecting cables or conductors with the upper contacts 11. In the form of the invention illustrated in the drawing, a conductor or cable may be connected with each of the upper contacts 11. Two spaced openings are provided in each end of the housing body 13 and are adapted to receive unions 60 for connecting with a conduit or tubing 61. Cables or conductors 62 pass through the tubing 61 into the interior of the housing body 13. Openings 63 are provided in the plates 24a and are spaced from opposite sides of the support 38. One conductor 62 extends through each end of the housing into an end compartment B and one conductor extends through each end of the housing into a second or middle compartment B.

Tubes 64 of insulation are arranged in the openings 63 and surround the conductors 62. Clamp parts 65 are provided on the lugs or blocks 42 to receive and grip the end portions of the conductors 62. As the openings 63 are spaced from the opposite sides of the carrier or support 38, the clamp parts 65 of alternate blocks 42 project in opposite directions. Screws 66 are provided for tightening the clamp parts 65 together. Terminals 67 are provided on the exposed end portions of the conductors 62 and are received between the clamp portions 65. The clamp screws 66 project upwardly toward the openings 46 so as to be readily engaged by a suitably insulated tool that may be inserted through the openings 46. It will be apparent how the cables or conductors 62 may be easily and quickly connected with and disconnected from the upper contacts 11. The invention provides diagram markings 70 on the exterior of the housing body 13 for indicating which of the conductors 62 are connected with the several contacts 11. The provision of the diagram markings 70 eliminates the possibility of making an error when removing the disconnecting pins 12.

It is believed that the utility and practicability of the switch provided by the present invention will be readily apparent from the foregoing detailed description. Each unit A of the switch handles only one phase of the primary circuit so that there is no possibility of a three phase short circuit developing. The transfer bus or common conductor 34 of a unit A operates to electrically connect all of the contacts 11 through the medium of the pins 12 so that a pin 12 carrying an outgoing or secondary circuit may be removed without breaking the primary circuit or the other secondary circuits. Due to this arrangement and the provision of the individually removable pins 12, the phase relations the primary conductors may be easily and quickly corrected without requiring handling or distorting of the conductors and without the possibility of injuring the operator or equipment. The conductors 62 connected with the upper contacts 11 need not be removed or shifted as the disconnecting pins 12 may be quickly removed to disconnect any one of the circuits. The switch is compact and light in weight, and the disconnecting pins 12 are readily accessible. Due to the provision of the inclined portions 17 of the housings 13 and the inclined parts 23 of the covers 14, the plugs 50 are readily accessible and the pins 12 may be easily engaged after removal of the plugs. The safety bushings 51 prevent contact of the pins with the housing 10, and the insulated handle 55 of the pin engaging tool prevents injuring of the operator. The pins 12 when engaged by the handling tool may be suddenly pulled upwardly so as to break the circuits, and as the contacts 11 are submerged in oil, all possibility of dangerous arcing is eliminated. The oil contained in the housings 10 is free to circulate between the wires 44 of the contacts 11 and through the tubular portions of the pins 12 to prevent overheating of the parts. The provision of the openings 46 permits the easy changing of the connections of the cables with the upper contacts and the quick safe removal and replacement of the pins 12 without removing the cover 14. The openings 46 are comparatively small so that there is little or no danger of dropping objects into the housing. As the cover 14 need never be removed the parts in the housing cannot be accidently engaged by tools, equipment, or the operator.

Having described only a typical form and application of my invention, I do not wish to be restricted or limited to the particular form or application set forth, but wish to reserve to myself any variations or modifications that may appear to those skilled in the art or fall within the scope of the following claims:

Having described my invention, I claim:

1. A switch including, a plurality of units arranged one above the other, each unit comprising, a housing, a plurality of pairs of spaced contacts in the housing, a removable pin connecting the contacts of each of said pairs, a common conductor electrically connecting corresponding contacts of the several pairs, and means for connecting conductors with the other contacts, the housing including an inclined upper wall having openings through which the pins are accessible, and a downwardly and inwardly inclined side wall portion rendering the said openings of a lower housing readily accessible.

2. In a switch of the character described, a housing, a plurality of spaced plates of insulation in the housing partitioning the interior of the housing into compartments, the plates having openings, a pair of spaced contacts in each compartment, a removable pin normally connecting the contacts of each pair, and means for supporting the contacts on the plates including a common bus electrically connected with one contact of each of said pairs and supported in openings in the plates.

3. In a switch of the character described, a housing, a plurality of spaced plates of insulation in the housing partitioning the interior of the housing into compartments, a lower contact in each compartment, an upper contact in each compartment spaced from the lower contact, removable pins extending between and engaged by the contacts, a bus electrically connecting the lower contacts and supporting them on the plates, and means for connecting conductors with the upper contacts.

4. In a switch of the character described, a housing, a plurality of spaced plates of insulation in the housing partitioning the interior of the housing into compartments, a lower contact in each compartment, an upper contact in each compartment spaced from the lower contact, removable pins extending between and engaged by the contacts, a bus electrically connecting the lower contacts and supporting them on the plates, a member supporting the upper contacts on the plates, and means for connecting conductors with the upper contacts.

5. In a switch of the character described, a housing, a plurality of pairs of spaced contacts in the housing, removable pins extending between and engaged by the contacts, there being openings in the wall of the housing through which the pins may be engaged, and removable plugs normally closing said openings, the plugs having inner parts of insulating material for engaging the pins in the event the pins are not properly positioned.

6. In combination, a switch unit including, a housing, a plurality of pairs of spaced contacts in the housing, removable disconnect pins extending between and engaged by the contacts, a common bus in the housing electrically connected with one contact of each of said pairs, and means for releasably connecting conductors with the other contacts including conductor gripping parts in connection with said other contacts, and screws cooperating with said parts for actuating said parts to grip the conductors, there being openings in the housing, and an insulated tool adapted to be passed through said openings to operate the screws, the pins being engageable and removable through said openings.

7. A switch for controlling a poly-phase circuit including a plurality of units each adapted to control one phase of the circuit and each including a housing, the housings being arranged one above the other and relatively close to one another, the housings including inclined upper wall portions having openings, contacts in the housings, and disconnect pins in the housings cooperating with the contacts and removable through said openings, the housings including downwardly and inwardly inclined side wall portions above the said upper wall portions of the adjacent lower housings rendering said openings readily accessible for the removal of the pins.

8. A switch for controlling a poly-phase circuit including a plurality of units each adapted to control one phase of the circuit and each including a housing, the housings being arranged one above the other and relatively close to one another, the housings including inclined upper corner wall portions having openings, contacts in the housings, and disconnect pins cooperating with the contacts and removable through said openings, said openings being positioned in said portions so that the pins may be withdrawn through them without interfering with the adjacent housings.

9. In a switch for controlling a circuit including a housing having an inclined upper wall portion provided with openings, contacts in the housing, and inclined disconnect pins for cooperating with the contacts, the longitudinal axes of the pins being substantially normal to said wall portion and the pins being removable through said openings, the housing including a downwardly and inwardly inclined front wall portion substantially parallel with the pins.

CLARENCE B. JUDSON.